US012574850B2

(12) United States Patent
Siddappa et al.

(10) Patent No.: US 12,574,850 B2
(45) Date of Patent: Mar. 10, 2026

(54) METHOD AND DEVICE FOR MAINTAINING POWER TO A PORTABLE MESH NODE WHILE IT IS IN TRANSIT

(71) Applicant: DISH Network Technologies India Private Limited, Bangalore (IN)

(72) Inventors: Ananda Siddappa, Bangalore (IN); Dileep Puramana, Bangalore (IN); Anandaraj Philips, Bangalore (IN); Vikram Balaraja Shetty, Bangalore (IN)

(73) Assignee: DISH Network Technologies India Private Limited, Bangalore (IN)

( * ) Notice: Subject to any disclaimer, the term of this patent is extended or adjusted under 35 U.S.C. 154(b) by 728 days.

(21) Appl. No.: 17/975,513

(22) Filed: Oct. 27, 2022

(65) Prior Publication Data

US 2024/0147369 A1     May 2, 2024

(51) Int. Cl.
| | |
|---|---|
| *H04W 52/02* | (2009.01) |
| *H04Q 9/00* | (2006.01) |
| *H04W 24/08* | (2009.01) |
| *H04W 24/10* | (2009.01) |
| *H04W 84/12* | (2009.01) |

(52) U.S. Cl.
CPC .......... *H04W 52/0235* (2013.01); *H04Q 9/00* (2013.01); *H04W 24/08* (2013.01); *H04W 24/10* (2013.01); *H04Q 2209/40* (2013.01); *H04Q 2209/88* (2013.01); *H04W 84/12* (2013.01)

(58) Field of Classification Search
CPC . H04W 52/0235; H04W 24/08; H04W 24/10; H04W 84/12; H04Q 9/00; H04Q 2209/40; H04Q 2209/88
See application file for complete search history.

(56) References Cited

U.S. PATENT DOCUMENTS

| | | | |
|---|---|---|---|
| 7,715,395 B2 | 5/2010 | Ginchereau et al. | |
| 8,427,942 B2 | 4/2013 | Kim et al. | |
| 9,678,507 B1 * | 6/2017 | Douglas ................... | G08G 5/22 |
| 11,234,254 B2 | 1/2022 | Hareuveni et al. | |
| 11,838,884 B1 * | 12/2023 | Dergosits .............. | G06F 1/3234 |
| 2014/0376529 A1 * | 12/2014 | Ramachandran ..... | H04W 24/02 370/338 |
| 2019/0020210 A1 * | 1/2019 | Partovi ................... | B60L 53/36 |
| 2019/0074718 A1 * | 3/2019 | Aliakseyeu .......... | H05B 47/196 |

(Continued)

*Primary Examiner* — Abdullahi Ahmed
(74) *Attorney, Agent, or Firm* — Seed Intellectual Property Law Group LLP

(57)     ABSTRACT
The present disclosure is directed to a portable mesh node to enhance a Wi-Fi connection throughput in an area with a weak coverage of an access point (AP). The portable mesh node provides an intermediate communication node that is moving to locations of the area which needs an improvement of the Wi-Fi connection throughput. A docking station is fixed in each location with a weak Wi-Fi connection throughput to provide a long-term energy source for the portable mesh node. Each docking station includes a power source to be coupled to the portable mesh node. The portable mesh node includes a transit power supply which provides a sufficient electrical energy during movements of the portable mesh node from a first location to a second location. Thus, the portable mesh node is capable of maintaining the Wi-Fi connection even during the movements between some locations.

20 Claims, 6 Drawing Sheets

(56) References Cited

U.S. PATENT DOCUMENTS

| | | | | |
|---|---|---|---|---|
| 2019/0082852 A1* | 3/2019 | Guschmer | ................ | A47C 7/70 |
| 2019/0227573 A1* | 7/2019 | Addonisio | ............ | B64U 70/00 |
| 2020/0275369 A1* | 8/2020 | Foster | ................ | H04W 52/028 |
| 2021/0006984 A1* | 1/2021 | Keaton | ................ | H04W 24/02 |
| 2021/0135473 A1* | 5/2021 | Wigney | ................ | H01M 10/48 |
| 2024/0334384 A1* | 10/2024 | Ganapathy | ............ | G01S 5/0284 |
| 2025/0220739 A1* | 7/2025 | Erhard | ................. | H04W 76/12 |

* cited by examiner

METHOD AND DEVICE FOR MAINTAINING POWER TO A PORTABLE MESH NODE WHILE IT IS IN TRANSIT

BACKGROUND

Technical Field

The present disclosure is directed to a portable mesh node to enhance a Wi-Fi connection throughput where a network coverage by an access point is weak.

Description of the Related Art

Increasing demand to high-speed internet access results in emerging infrastructure networks managed by an EHT (Extremely High Throughput) access point (AP). For instance, IEEE 802.11ax (Wi-Fi 6) or IEEE 802.11be (Wi-Fi 7) provides high-speed internet access by enhancing peer-to-peer (P2P) traffic. Although the new EHT infrastructures provide higher rate of the communication for more communication devices (e.g., devices connected to a router in a house for an internet access over a Wi-Fi protocol), the coverage area of the AP (e.g., the router) is reduced due to increasing the operation frequency of the EHT infrastructures. Generally, the later communication protocol (e.g., Wi-Fi 7) utilizes higher frequency bands compared with the older protocols. The higher frequency has a lower coverage range compared with the lower frequency technologies, due to an increasing of the free space loss and attenuations from the obstacles in the communication area (e.g., walls of the rooms in a house). Therefore, by emerging the high-speed technologies which operate in a higher frequency range, there is a need to utilize some techniques that enhance the Wi-Fi throughput in areas that are farther from the AP.

BRIEF SUMMARY

The present disclosure is directed to a portable mesh node to enhance a Wi-Fi connection throughput in an area with a weak coverage of an access point (AP). In particular, the AP may be a router which provides internet access for a specific area (e.g., a house, a warehouse, or university campuses). The portable mesh node provides an intermediate communication node that can be moved to locations of the area which needs an improvement of the Wi-Fi connection throughput. The intermediate communication node provides the internet connection between the AP and one or more client devices (e.g., smart phone, laptops, computers, or sensors for internet of things (IoTs)).

In some embodiments, the Wi-Fi connection throughput is measured in the different locations of the area to determine the locations having a Wi-Fi connection throughput less than a threshold. A docking station may be fixed within in or adjacent to each determined location. The docking station is within an area that has sufficient Wi-Fi coverage from the base access point. The docking station is coupled to a permanent power supply, such as a wall socket that is part of the power grid and can provide a stable, constant electric power for the portable mesh node. For instance, the area may be a house with a plurality of locations (e.g., bedrooms, kitchen, living room, garage, and garden), while the AP is fixed in one of the plurality of locations. In this condition, the measured Wi-Fi connection throughput is greater for the locations closer to the AP compared with the locations farther from the AP. The docking stations are positioned within or adjacent to locations having the Wi-Fi connection throughput less than the threshold. The portable mesh node may be moved and plugged into each location that has a docking station to improve the Wi-Fi connection throughput for that location to a value greater than the threshold. Each docking station includes a power source to be coupled to the portable mesh node. In various embodiments, the power source of the docketing station may be coupled to the portable mesh node wirelessly or through a wire connection.

The portable mesh node includes a transit power supply which provides sufficient electrical energy during movements of the portable mesh node from a first location to a second location. Thus, the portable mesh node is capable of maintaining the Wi-Fi connection even during the movements between some locations. In some examples, the transit power source is rechargeable and is charged when the portable mesh node is coupled to the respective docking station. In addition, the portable mesh node may include a sensor that measures the Wi-Fi connection throughput and indicates if the portable mesh node is in a covered range from the AP. In some embodiments, the portable mesh node automatically changes an operation mode to a low-power mode when using electrical energy of the transit power source.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to various communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
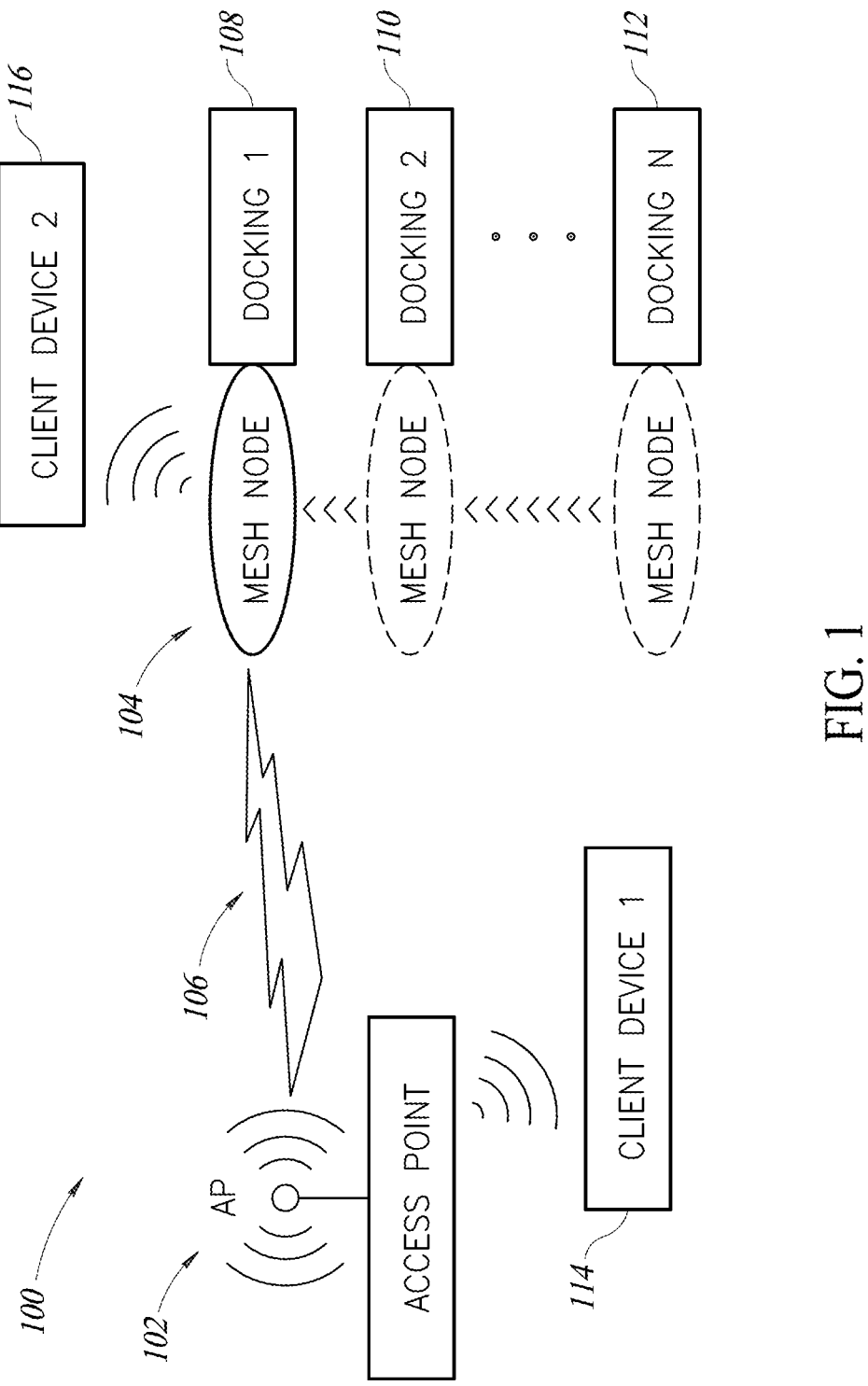
FIG. 1 is a block diagram illustrating a system for providing Wi-Fi connection throughput between an access point and client devices in accordance with embodiments described herein.

FIG. 1 is a block diagram illustrating a system 100 for providing a Wi-Fi connection throughput between an access point (AP) 102 and client devices 114, 116. A portable mesh node 104 operates as an intermediate node to provide the Wi-Fi signal between the AP 102 and the client device 116. The mesh node can receive a medium or low power and low bandwidth Wi-Fi signal from the mesh node 104 and then rebroadcast it having boosted power and increased bandwidth. A plurality of docking stations 108, 110, and 112 are fixed in different locations. The number of docking stations depends on the number of the locations that need an enhancement of the Wi-Fi connection throughput. In various embodiments, the number of the docking stations may be more than three or less than three. The portable mesh node 104 is coupled to the AP 102 by a wireless network signal 106. The portable mesh node 104 is capable of coupling to each of the plurality of docking stations 108, 110, and 112 and receiving electrical power from a power source of the respective docking station.

In this embodiment of the system 100, a first client device 114 is positioned in a location that has a Wi-Fi connection throughput greater than a threshold. Thus, the first client device 114 is directly connected to the AP 102 to communicate over the Wi-Fi protocol. However, the second client device 116 is positioned in a location where the Wi-Fi connection throughput is less than the threshold. In this condition, the second client device 116 may lose an internet connection from time to time of the Wi-Fi provided by the AP 102. The portable mesh node 104 is moved close enough to the location of the second client device 116 to output and provide a Wi-Fi connection for the second client device 116 of sufficient strength that it has a throughput to a value greater than the threshold. Accordingly, the second client device 116 establishes an internet connection with the Wi-Fi connection throughput greater than the threshold through the portable mesh node 104.

The client device might be present in different locations in a specific area (e.g., a house, a warehouse, or university campuses). For example, different cell phone users might be three or four different rooms of a house. In some embodiments, the portable mesh node 104 may be moved by a user to the location of the second client device 116. Each of the docking stations 108, 110, and 112 are fixed in different locations. For instance, the docking station 108 may be fixed in the respective location of the second client device 116. In this condition, the portable mesh node 104 may be coupled to the docking station 108 when moved to the location of the second client device 116. Thus, the docking station 108 provides the electrical energy for operation of the portable mesh node 104. In addition, the portable mesh node 104 includes a transit power supply that provides the sufficient electrical energy for operation of the portable mesh node 104 when it is being moved toward the docking station 108. Therefore, the internet access of the second client device 116 remains connected even when the portable mesh node 104 is not coupled to a power source of each of the docking stations 108, 110, and 112.

The system 100 provides an internet access for a plurality of client devices in an area without a need to utilize multiple mesh nodes. In this embodiment, the portable mesh node 104 enhances the Wi-Fi connection throughput only in a location that one or more client devices exist. In various embodiments, the number of the client devices may be more than the two devices that are described in FIG. 1. For example, a plurality of client devices may be positioned in different locations in the area of the system 100. In this condition, a user may move the portable mesh node 104 to a location which has higher demand for internet connection. The position of the portable mesh node 104 may be dynamically changed by the user. This might be done if the number of the client devices increases in particular location, the strength of the signal from AP changes, or other reasons.

In various embodiments of the present disclosure, the AP 102 may be configured to connect to a router (e.g., via a wired/wireless network), as a standalone device, or operate as an integral component of the router itself. A client device such as the client devices 114, 116 may be implemented by any physical wireless network-compatible device (also referred to as a "network device"), e.g., including software implementing a virtual network device, or the like. A client device or network device may include one or more mobile devices and/or one or more stationary device. Examples of a mobile device include a mobile phone, e.g., a feature phone or a smartphone, a radio message receiver, a tablet, a laptop, a smartwatch, any mixed form of these device types, among others. Other examples of a client or network device also include wireless headphones, a wireless dock, a wireless speaker, or other devices, which are capable of coupling to a wireless network.

Examples of the wireless network signal 106 described herein may include a Wireless Local Area Network (WLAN), or a personal area network (PAN) such as a wireless PAN (WPAN), a Bluetooth network, or a nonlocal network (such as a Metropolitan Area Network (MAN), a Wide Area Network (WAN), or a Global Area Network (GAN). The wireless network may include or be formed from of a cellular radio network (e.g., an IEEE 802.11), a Bluetooth network, or another mobile radio network.

Further examples of a wireless network may include Ultra-Wide Band (UWB) network, and/or a WLAN. The WLAN may be provided in accordance with Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), HiperLAN/2 (High Performance Radio LAN; an alternative ATM-like 5 GHz standardized technology), Vehicle-to-Vehicle (V2V) and Vehicle-to-X (V2X) and Vehicle-to-Infrastructure (V2I) and Infrastructure-to-Vehicle (I2V) communication technologies. Examples of the IEEE 802.11 radio communication standard (also referred to as "IEEE802.11") may include IEEE802.11b, IEEE802.11b, IEEE802.11n (Wi-Fi 4), IEEE802.11ac (Wi-Fi 5), IEEE802.11ax (Wi-Fi 6), IEEE 802.11be (Wi-Fi 7), IEEE802.11a (5 GHz), IEEE802.11g (2.4 GHz), DSRC (Dedicated Short Range Communications), communication arrangements such as Intelligent-Transport-Systems, and other existing, developing, or future radio communication technologies.

Various aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), IMT-2020 spectrum (expected to include 3600-3800 MHz, 3.5 GHz bands, 700 MHz bands, bands within the 24.25-86 GHz range, unlicensed spectrum ranges 2.4-2.5 GHzs, 5-6 GHz, 6-7 GHz, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz, and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, some aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc., applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc., users, etc. Aspects described herein can also use radio communication technologies with different Single Carrier or OFDM flavors (CP-OFDM, SC-FDMA, SC-OFDM, filter bank-based multicarrier (FBMC), OFDMA, etc.), and in particular 3GPP NR (New Radio), which can include allocating the OFDM carrier data bit vectors to the corresponding symbol resources. Furthermore, aspects described herein may also use radio communication technologies with "AFC" (Automatic Frequency Coordination), e.g., for U-NII-5 or 7 (Unlicensed National Information Infrastructure 5 or 7).

Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Figure 2:
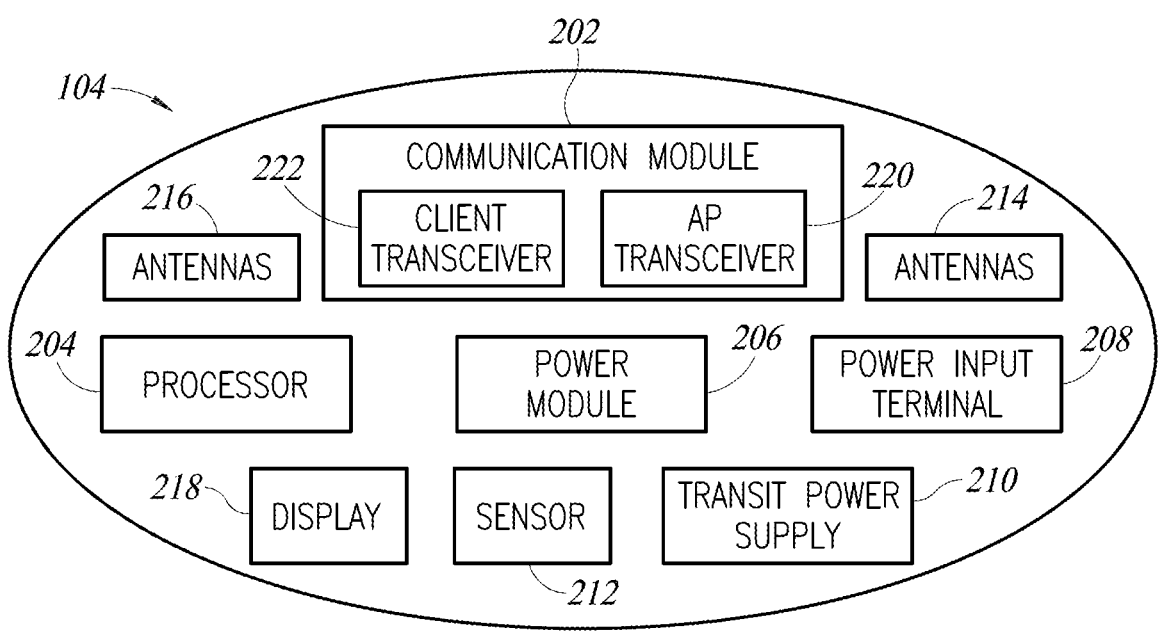
FIG. 2 is a block diagram illustrating internal components inside a mesh node in accordance with embodiments described herein.

FIG. 2 is a block diagram illustrating internal components inside the portable mesh node 104 described in FIG. 1. The portable mesh node 104 includes a communication module 202, a processor 204, a power module 206, a power input terminal 208, a transit power supply 210, a sensor 212, a first set of antennas 214, a second set of antennas 216, and a display 218. The communication module 202 includes an AP transceiver 220 and a client transceiver 222. In various embodiments, internal components of the portable mesh node 104 may include some, more, or less components than the depicted block diagrams in FIG. 2.

The communication module 202 communicates by the AP 102 of FIG. 1 through the AP transceiver 220 and the first set of antennas 214. The communication module 202 communicates by the client device 116 of FIG. 1 through the client transceiver 222 and the second set of antennas 216. In various embodiments, a plurality of client devices distributed in a location around the docking station 108. The communication module 202 may include an internal amplifier to amplify the received signals from each of the client device 116 and the AP 102 to be transmitted to each other. Hence, the client device 116 is able to achieve an internet access by the Wi-Fi connection throughput to the AP 102 greater than the threshold, even when it is positioned in a location that is not in the coverage of the AP 102.

The power module 206 may include voltage regulators, converters, inverters, and any other components that are needed to transfer the received electrical power from the power input terminal 208 and the transit power supply 210. The power module 206 supplies the received power into the other components such as the communication module 202, the processor 204, and the sensor 212. The power module 206 may include different converter and regulation circuits coupled to each of the power input terminal 208 and the transit power supply 210. In this condition, the power received from the power input terminal 208 is greater than the power received from the transit power supply 210, and consequently a different regulation and converter circuits are coupled to the power input terminal 208 rather than the regulation and converter circuits coupled to the transit power supply 210.

The power input terminal 208 includes a power socket to be coupled to an external power source such as the docking stations 108, 110, and 112. In various embodiments, the power socket may be compatible with any plug types (e.g., Type-C, Type-B, Type-F, and Type-A). The power socket may also include USB port and other type of ports to be coupled to the external power source. In addition, the power input terminal 208 may include a wireless power transfer (WPT) module to wirelessly receive electrical energy from a wireless power transmitter of the docking station.

The transit power supply 210 may include a supercapacitor. The supercapacitor may have a capacity to provide the sufficient electrical energy for the components of the portable mesh node 104 for a selected period of time. In some examples, the period of time may be a few minutes (e.g., 10 min). This period of time provides the opportunity to move the portable mesh node 104 from a docking station to another docking station without interruptions in the Wi-Fi connection throughput. In addition, or in place of a supercapacitor, a battery, whether standard or rechargeable battery may be used to increase the period of time that the portable mesh node operates without the need to be coupled to an external energy source. Alternatively, an external rechargeable battery can be coupled to the power module 206 when a user needs the portable mesh node 104 to operate for a longer period of time without coupling to the docking stations 108, 110, and 112.

In some embodiments, the power module 206 may include a battery management system (BMS) to detect the type of battery that is coupled to the transit power supply 210 and read the state of charge (SoC) of the coupled battery. In this condition, the BMS sends the SoC to the processor 204 to determine an operation mode of the portable mesh node 104 based on the SoC of the battery. The processor 204 may send the SoC to the display 218 to inform the user about the remaining time of operation without connection to the docking station. In a same condition, the power module 206 may send an indicative signal to the processor 204 for indicating if the portable mesh node 104 is coupled to a docking station or is using electrical energy of the transit power supply 210. In response, the processor 204 may change the operation mode of the portable mesh node 104 to a low-power mode. In addition, the BMS may transfer a portion of power from the power input terminal 208 into the transit power supply 210 to charge the supercapacitor or the rechargeable battery when the portable mesh node 104 is coupled to the docking station.

The processor 204 determines if the portable mesh node 104 is coupled to a docking station (e.g., 108, 110, and 112) or operates with the power of the transit power supply 210. If the processor 204 determines that the portable mesh node 104 is coupled to a docking station, then it may send a command to the communication module 202 to operate in a normal mode. During the normal mode operation, the communication module 202 utilizes all the antennas (e.g., 214 and 216) and operates in the highest transmission and receiving data rate over a Wi-Fi protocol. For instance, in the normal mode the communication module 202 may operates in Wi-Fi 7 protocol with a rate about 40 Gbps. In this example, the communication module 202 may also operate in Multi-Link Operation (MLO) mode which increases Wi-Fi connection throughput. If the processor 204 determines that the portable mesh node 104 is not coupled to the docking station, then it may send a command to the communication module 202 to operate in a low-power mode. During the normal mode, it will charge the supercapacitor and/or rechargeable battery, if either is present, and maintain them fully charged.

In the low-power mode operation, the communication module 202 may change the rate of the communication to reduce the power consumption. For instance, the communication module 202 may change the Wi-Fi connection protocol from Wi-Fi 7 to a lower rate protocol such as Wi-Fi 6 or 6E with a rate about 9.6 Gbps or Wi-Fi 5 with a rate about 6.9 Gbps. The lower rate of data results in lower power consumption. In addition, the communication module 202 may reduce the number of active antennas in each of the antenna sets 214 and 216. For example, the Wi-Fi connection may operate in a multi-input multi-output (MIMO) topology by 8 antennas in the antenna set 214 and 8 antennas in the antenna set 216 (which refers to 8×8 MIMO system used in Wi-Fi 6). In this condition, the communication module 202 may changes the MIMO topology from 8×8 MIMO to 4×4 MIMO by deactivating half antennas from each of the antenna sets 214 and 216 (e.g., 4×4 MIMO system used in Wi-Fi 5). Reducing the number of antennas results in reduction of power consumption of the portable mesh node 104 when it is operating in the low-power mode.

In some embodiments, the communication module 202 may limit the number of client devices coupled to the portable mesh node 104 when it is operating in the low-power mode. For example, a threshold of number of client devices that can be connected to the portable mesh node 104 may be stored in the processor 204. When the processor 204 sends the command of low-power operation to the communication module 202, it may determine the number of the client devices that are connected to the portable mesh node 104. In response, the processor 204 compares the number of the client devices with the threshold of number of client devices. If the number of the client devices coupled to the portable mesh node 104 exceeds the threshold, then the processor 204 may prioritize the client devices and disconnect the client devices with lower priority compared with the other client devices. The priority, for example, may be introduced based on the data rate that each client device is using or based on a time period of connection of each client device to the portable mesh node 104. By limiting the number of the client devices in the low-power mode operation, the portable mesh node 104 consumes less electrical energy compared with the normal mode operation.

The sensor 212 may include a Wi-Fi connection throughput measuring system to measure the Wi-Fi connection throughput between the AP 102 and the portable mesh node 104. The sensor 212 sends a throughput indicative signal to the processor 204 indicating the Wi-Fi connection throughput between the AP 102 and the portable mesh node 104. The processor 204 compares the throughput indicative signal with the throughput threshold. If the throughput indicative signal is less than the throughput threshold, then the processor 204 displays an alert message in the display 218. Thus, the user is notified when the portable mesh node 104 is moving outside the coverage area of the AP 102.

In some embodiments, the sensor 212 may include a short-range communication measurement system to detect a docking station in proximity of the portable mesh node 104. In this condition, the short-range communication measurement system sends a short-range signal (e.g., over Bluetooth or near-field communication (NFC) link) to the docking stations in a location (e.g., 108, 110, and 112). If the sensor 212 receives an acknowledgement signal from a docking station, then it sends an indicative signal to the processor 204 to display that a docking station is available in proximity of the location of the portable mesh node 104. In some examples, the acknowledgement signal may include an indicative data about the docking station, such as an identification number of the docking station. The processor 204 may send the identification number of the docking station to the display 218 to notify the user about the presence of the docking station in proximity of the portable mesh node 104. In various embodiments, the display 218 may include some features such as an alarm LED and a loud speaker that notify the user about exiting the coverage range of the AP 102 and a low-level of the electrical charge of the transit power module 210.

Figure 3:
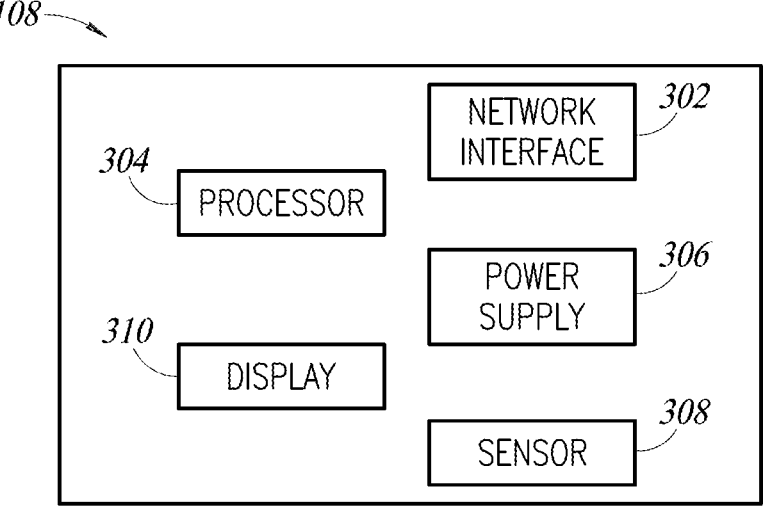
FIG. 3 is a block diagram illustrating internal components inside a docking station in accordance with embodiments described herein.

FIG. 3 is a block diagram illustrating internal components inside the docking station 108 that is described in FIG. 1. The docking station 108 includes a network interface 302, a processor 304, a power supply 306, a sensor 308, and a display 310. In various embodiments, the network interface 302 may wirelessly communicate with the portable mesh node 104 or operate with a wired network connection with the portable mesh node 104. In some embodiments, the network interface 302 may be capable of operation in both the wireless and wired connections with the portable mesh node 104. The network interface 302 may exchange data with the portable mesh node 104 about the electrical charge level of the transit power supply 210, the coverage area of the AP 102, and the number of clients present in the location of the docking station 108 to be coupled to the portable mesh node 104.

The processor 304 reads the data received from the portable mesh node 104 and represents on the display 310 to notify the user of the portable mesh node 104. In some embodiments, the processor may compare the received data about the electrical charge level of the transit power supply 210 with an energy threshold. If the electrical charge level is below the energy threshold, then the processor sends an alert to the display to notify the user to plug the portable mesh node 104 into the power supply 306. In some examples, the display 310 may include some features such as an alarm LED and a loud speaker that notify the user about the charge level of the portable mesh node 104.

The sensor 308 may be in communication with the sensor 212 and include a short-range communication measurement system to detect the portable mesh node 104 in proximity of the docking station 108. In this condition, the short-range communication measurement system sends a short-range signal (e.g., over Bluetooth or NFC communication link) to the portable mesh node 104. If the sensor 308 receives an acknowledgement signal from the portable mesh node 104, then it sends an indicative signal to the processor 304 to display that the portable mesh node 104 is in proximity of the location of the docking station 108. In some examples, the acknowledgement signal may include an indicative data about the portable mesh node 104, such as an identification number of the portable mesh node 104. The processor 304 may determine, from the identification number of the portable mesh node 104, whether the portable mesh node 104 utilizes a wireless power transfer system or needs to plug in by a socket. In response, the processor 304 sends a command to the power supply 306 to activate a wireless power transfer module or a socket output to be coupled to the portable mesh node 104.

Figure 4A:
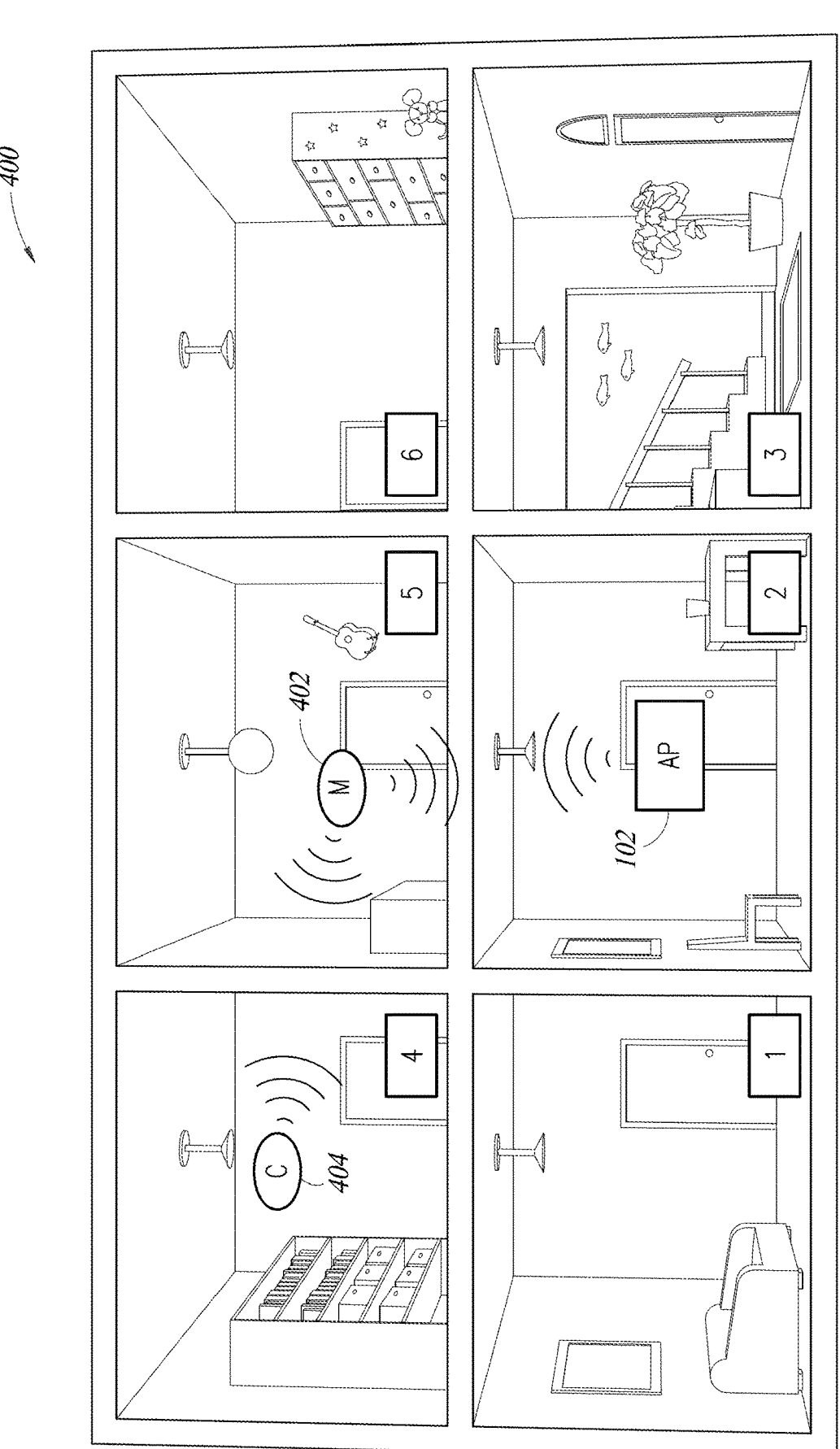
FIG. 4A is an example of using a mesh node for a Wi-Fi connection in a multi-floor house in accordance with the prior art.

FIG. 4A is an example of using a mesh node 402 for a Wi-Fi connection in a multi-floor house 400 according to the prior art. In this example, the house 400 includes six different locations that are numbered from 1 to 6. The AP 102 is positioned in the room number 2 of the first floor. The Wi-Fi connection throughput is sufficient to cover the rooms 1 and 3 on the first floor. However, the room numbers 4-6 have a weak Wi-Fi connection throughput due to the roof of the first floor and the walls that reduces the strength of the Wi-Fi signal. In this condition, the mesh node 402 is fixed in the room number 5 that is on the top of the AP 102 in the room number 2. Thus, the Wi-Fi connection throughput is amplified in the room number 5 by the mesh node 402.

A client device 404 in the room number 4 is out of coverage area of the AP 102 and receives the Wi-Fi connection throughput less than a throughput threshold. The client device 404 requests to be connected to the Wi-Fi through the mesh node 402. However, the walls and obstacles between the mesh node 402 and the client device 404 may prevent a sufficient connection between these network components. This problem is worse when the AP 102 is operating in higher frequency band. Thus, by using the new Wi-Fi protocols with higher frequency range, this fixed mesh node 402 may not cover all the rooms of the house 400. In some techniques, one mesh node can be fixed in each of the rooms 4-6. However, using additional mesh nodes increases the cost and energy consumption, while there may not be a need for simultaneously amplifying the Wi-Fi signal in some of the rooms that are not in use with any client device.

Figure 4B:
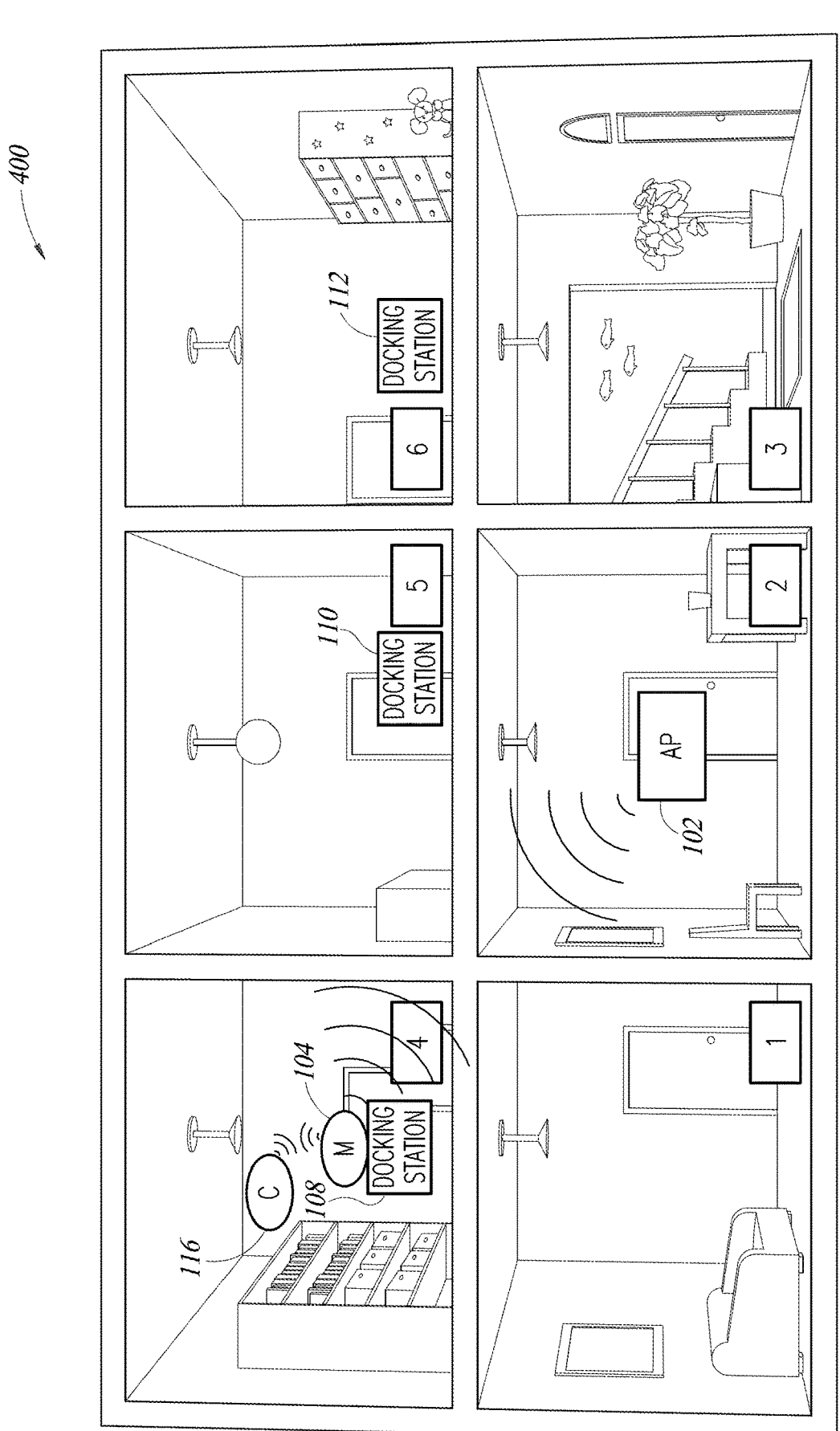
FIG. 4B is an example of using a portable mesh node for a Wi-Fi connection in a multi-floor house in accordance with embodiments described herein.

FIG. 4B is an example of using the portable mesh node 104 for a Wi-Fi connection in the multi-floor house 400 according to the present disclosure. This example corresponds to the system 100 described in FIG. 1. The AP 102 is positioned in the room number 2 that covers the first floor. The room numbers 4-6 on the second floor have a Wi-Fi connection throughput less than a throughput threshold. Thus, the docking stations 108, 110, and 112 are fixed in the room numbers 4, 5, and 6, respectively. The portable mesh node 104 is capable of dynamically moving between the rooms that have a docking station. The transit power supply 210 of the portable mesh node 104 that is described in the FIG. 2, maintains the Wi-Fi connection throughput when the portable mesh node is in transit.

In this embodiment, the client device 116 that is described in FIG. 1 is positioned in room number 4. To enhance the Wi-Fi connection throughput in the location of the client device 116, the portable mesh node 104 is moved to the room number 4. In this condition, the room numbers 5 and 6 are not in use with any client device, thus, there is no need for a mesh node in those rooms. If the client device 116 moves to another room, e.g., room number 6, then any one of the docking station 112 in room 6 or the client device 116, may notify the user to move the portable mesh node 104 to the room number 6.

In some examples, the number of client devices may be more than one that are distributed in different rooms. In this condition, the portable mesh node 104 may be moved to a location between the rooms (e.g., a lobby or hallway that has access to all the rooms) to provide the sufficient Wi-Fi connection throughput for the different client devices positioned in different rooms. In another example, the user may decide to move the portable mesh node 104 to a room that needs a higher Wi-Fi connection throughput compared with the other rooms. For instance, there may be some client devices such as smartphones in a bedroom while there is a working laptop in an office room. In this situation, the user may decide to move the portable mesh node to the office room that need higher Wi-Fi connection throughput for a longer time compared with the smartphones in the bedroom. Although moving the portable mesh node to the office room may reduce the Wi-Fi connection throughput in the bedroom, the smartphones in the bedroom may remain connected to the portable mesh node. In this example, after moving the portable mesh node to the office room, the smartphones in the bedroom may use a second Wi-Fi connection that is different than a first Wi-Fi connection that was previously established. They might connect directly to the AP 102 or to a different mesh node. Alternatively, they may remain connected to the same mesh node 104, but the second Wi-Fi connection but may operate in a lower frequency spectrum or lower data rate of the communication than the first Wi-Fi connection. In some embodiments, the first Wi-Fi connection may operate in a Wi-Fi 7 protocol while the second Wi-Fi connection is operating in Wi-Fi 6 or Wi-fi 5 protocols.

In addition, each of the docking stations may automatically indicate the number of the client devices in the respective rooms and send the information to the portable mesh node 104 to be displayed to the user. In this condition, the user of the portable mesh node 104 can decide, based on the information received from different docking stations, to move the portable mesh node 104 to a room with higher priority compared with the other rooms.

In an alternative embodiment, more than one portable mesh node may be used in a house with a large area or in some large places, such as university campuses or a warehouse. In this alternative embodiment, there is no need to install a mesh node to each room of the area. However, there are multiple portable mesh nodes available to be moved to the rooms with a greater demand to the Wi-Fi connection throughput. For example, during an event such a conference in a building of the university, there may be some presentation in some of the rooms while the other rooms of the building are not in use for the event. In this condition, some portable mesh nodes are moved to the presentation rooms to increase the Wi-Fi connection throughput in those rooms. The number of the portable mesh node that are used in this condition still is lower than the number of rooms in the building that need improvement of the Wi-Fi connection throughput.

Figure 5A:
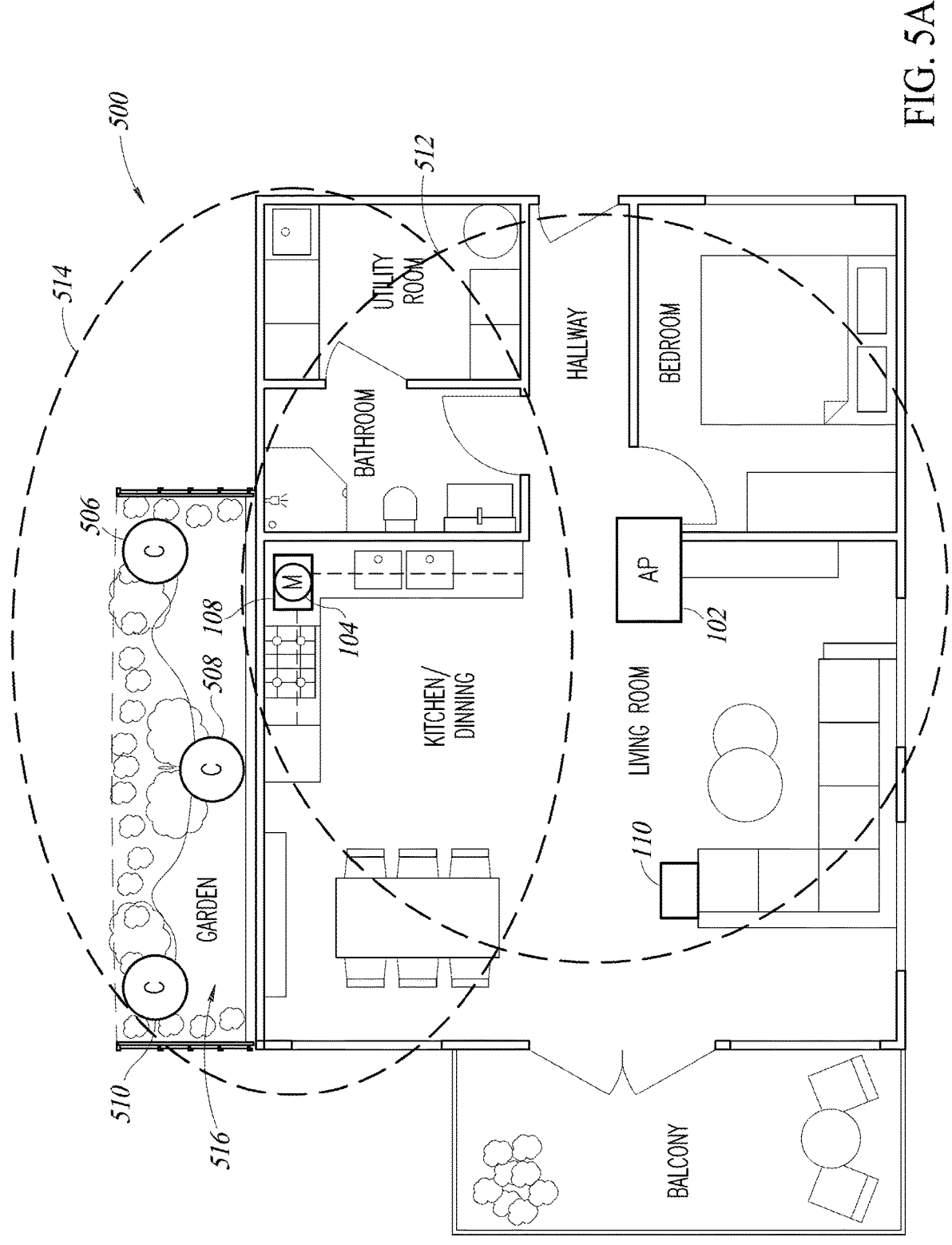
FIGS. 5A-5B are examples of using a portable mesh node for a Wi-Fi connection in a single-floor house in accordance with embodiments described herein.

FIG. 5A is an example of using the portable mesh node 104 for a Wi-Fi connection in a single-floor house 500. The AP 102 is installed in a living room of the house 500. A boundary 512 depicts the coverage area of the AP 102. The Wi-Fi connection throughput inside the boundary 512 is greater than the throughput threshold, while the Wi-Fi connection throughput outside the boundary 512 is less than the throughput threshold. A plurality of client devices 506, 508, and 510 are in a garden area 516 (e.g., smartphones or laptops of a group of people in the house). In this condition, the plurality of client devices 506, 508, and 510 are outside the boundary 512 that has a weak Wi-Fi connection throughput less than the throughput threshold. However, by moving the portable mesh node 104 to a kitchen/dining area and placing it on the docking station 108 in that area that is inside the boundary 512, the Wi-Fi connection throughput is increased to reach a secondary boundary 514. The secondary boundary 514 depicts a coverage area of the portable mesh node 104. The Wi-Fi connection throughput inside the boundary 514 is greater than the throughput threshold, while the Wi-Fi connection throughput outside the boundary 514 is less than the throughput threshold. Hence, by moving the portable mesh node 104 to the kitchen/dining area, the plurality of the client devices 506, 508, and 510 in the garden area 516 have the sufficient Wi-Fi connection throughput greater than the throughput threshold. In some examples, some docking stations may be installed in each area of the house 500 to provide the power for the operation of the portable mesh node 104. For instance, the portable mesh node 104 may be coupled to a docking station in the kitchen/dining area to provide the sufficient Wi-Fi connection throughput for the client devices in the garden area 516. In this example the docking stations may be in a wired connection with the AP 102 (e.g., by a LAN network), thus, the portable mesh node 104 may communicate with the AP 102 through the docking station and provide the sufficient Wi-Fi connection throughput in the boundary 514.

In some alternative embodiments, the portable mesh node 104 may operate without need to be connected to the docking station. Thus, the docking station is not needed in all embodiments and the mesh node can be powered by having its own power supply, whether by battery or being plugged into a grid power supply node. Thus, the transit power supply 210 of the portable mesh node 104 (as described in FIG. 2) may be a high-capacity chargeable battery that is capable of operating for a long time without need for an external power (e.g., several hours). In some examples, the high-capacity chargeable battery may be an external source provided by the user to decrease the cost and weight of the portable mesh node 104. In this condition, the external high-capacity chargeable battery may be coupled to the portable mesh node 104 with a power socket or by a wireless power transfer system. In addition, the portable mesh node 104 detects the boundary 512 by measuring the Wi-Fi connection throughput by the sensor 212 that is described in FIG. 2. Thus, if the user moves the portable mesh node 104 outside the boundary 512, then a notification alert is displayed on the portable mesh node 104 to notify the user about passing the boundary 512.

Figure 5B:
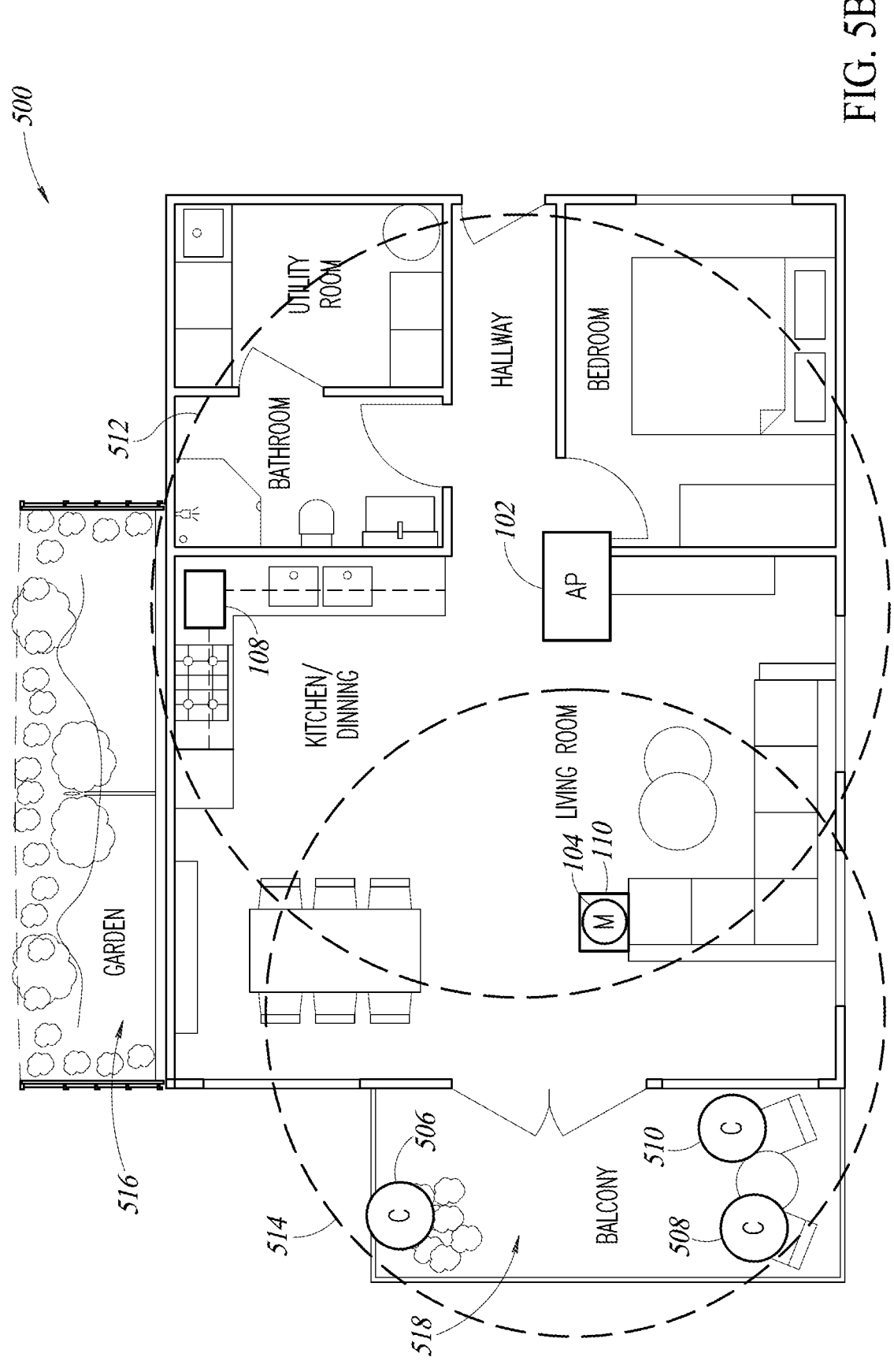

FIG. 5B is another example of using the portable mesh node 104 for the Wi-Fi connection in the single-floor house 500. In this example, the plurality of the client devices 506, 508, and 510 are moved from the garden area 516 to a balcony area 518. The balcony area 518 is outside the boundary 512 and needs an enhancement of the Wi-Fi throughput.

When the client devices move to the balcony area 518, a sensor in one of the client devises 506, 508, 510 or in the mesh node 104 provides an indication that the client devices now in the balcony area 518 have less than the threshold amount of throughput to the Wi-Fi signal. Accordingly, an alert, alarm or other notice is output from the device whose sensor indicates that the coverage is below the threshold. The users can then pick up the mesh node 104 that is in the kitchen area and move it to living room. The mesh node 104 can be plugged into the docking station 110 that is in the living room and now Wi-Fi coverage can be provided for the balcony area 518.

While the mesh node 104 is being moved from the kitchen to the living room, it is not connected to a power source. The internal power supply will keep it in operation and maintain the Wi-Fi connections that are being supported by the mesh node 104. The move time to the new location might be in the range of one minute and will take less than 5 minutes, therefore, the internal power source only needs to provide power for a short time, and it can be a small, low cost power storage device. The processor circuit inside the mesh node 104 will recognize that power is now being provided by the internal power supply and will perform transition into the low power mode while providing sufficient power to maintain the Wi-Fi connections between the AP 102 and the client devises 506, 508, 510, as previously explained herein.

Hence, the portable mesh node 104 is moved to an area of the living room, in which the boundary 514 covers the balcony area 518. In this condition, there is no client device in the garden area 516, and consequently there is no need for a mesh node to cover the garden area 516. Using the portable mesh node 104 provides the opportunity to dynamically enhance the Wi-Fi connection throughput without using multiple fixed mesh nodes in the house 500. As described in FIG. 4B, it is possible to use multiple portable mesh nodes to simultaneously enhance the Wi-Fi connection throughput of multiple locations in the house 500. For instance, a secondary portable mesh node may be positioned in the kitchen/dining area to cover the garden area 516, while the portable mesh node 104 is positioned in the living room to cover the balcony area 518.

A network management system may be summarized as including: an access point configured to receive and transmit data according to a Wi-Fi connection; a plurality of docking stations, each docking station fixed in a respective separate location and having a communication interface and a power supply terminal; a portable mesh node having a Wi-Fi transceiver for wirelessly communicating with the access point and a client transceiver for communicating with a client device, the portable mesh node being movable to each of the respective locations at which one of the plurality of docking stations is located; a power module within the portable mesh node; a power input terminal coupled to the power module and configured to be connected to the power supply terminal of a respective docking station of the plurality of docking stations; and a transit power supply within the portable mesh node, the transit power supply being coupled to the power module and configured to provide power to the power module when the portable mesh node is not connected to the power supply terminal of one of the plurality of docking stations.

A throughput of a Wi-Fi connection in a plurality of locations may be less than a coverage threshold, and the portable mesh node may increase the throughput to a value greater than the coverage threshold in each location that the portable mesh node is placed. The portable mesh node may include a processor that is configured to: determine if the portable mesh node is disconnected from the power supply terminal; and in response, change an operation of the portable mesh node from a normal mode to a low-power mode. The portable mesh node may include a communication module that receives and transmits data at a first rate when the portable mesh node is operating in the normal mode, and receives and transmits data at a second rate when the portable mesh node is operating in the low-power mode, wherein the first rate may be greater than the second rate. The communication module may include a plurality of antennas, a first subset of the plurality of antennas actively communicating with the access point and the client device in the normal mode operation, a second subset of the plurality of antennas actively communicating with the access point and the client device in the low-power mode operation, wherein the first subset may be greater than the second subset. The processor may be configured to: determine if a number of client devices that are in communication with the portable mesh node in the normal mode operation is greater than a first threshold, in response disqualifying any further connections until the number of client devices that are in communication with the portable mesh node become less than the first threshold; and determine if the number of client devices that are in communication with the portable mesh node in the low-power mode operation is greater than a second threshold, in response disqualifying any further connections until the number of client devices that are in communication with the portable mesh node become less than the second threshold, wherein the first threshold is greater than the second threshold. The portable mesh node may include a sensor that measures strength of a receiving signal from the access point and in response generates a throughput indicative signal. The processor may compare the throughput indicative signal with a signal strength threshold, and may generate an alarm signal when the throughput indicative signal is less than the signal strength threshold. The portable mesh node may be connected to the power supply terminal of one of the plurality of docking stations by a wireless power transfer module. Each of the docking stations may include: a communication interface that communicates with the access point and client devices in the respective location; a sensor that indicates a throughput of a Wi-Fi connection to the client devices in the respective location; and a processor that determines if the throughput of the Wi-Fi connection to the client devices in the respective location is less than a coverage threshold, and in response generates a request signal for sending to the portable mesh node.

A method may be summarized as including: mounting a plurality of docking stations in a plurality of locations having a throughput of a Wi-Fi connection less than a threshold; determining, by each of the plurality of docking stations, a demand of the Wi-Fi connection at each of the plurality of locations; moving a portable mesh node to one of the locations having a docking station and a higher demand of the Wi-Fi connection compared with the other locations; supplying power to the portable mesh node from a transit power supply while the portable mesh node is in transit from a first docking station to a second docking station, the transit power supply maintaining the portable mesh node in operation during the moving step; and coupling a power supply of the respective docking station in that location to a power input terminal of the portable mesh node.

The method may further include determining if the portable mesh node is disconnected from the power supply; and switching the operation of the portable mesh node from a normal mode to a low-power mode in response to determining that the portable mesh node is disconnected from the power supply.

Switching the operation of the portable mesh node from a normal mode to a low-power mode may include at least one of: reducing a rate of exchanging data between the portable mesh node and an access point; reducing a number of active antennas of the portable mesh node; and reducing a number of client devices connected to the portable mesh node.

The method may further include transmitting a request signal to the portable mesh node by the docking station in response to determining the demand of the Wi-Fi connection in the respective location is higher than the demand in the other locations.

The method may further include measuring, by the portable mesh node, strength of a signal received from an access point; and generating an alert signal if the measured strength is less than a signal strength threshold.

A device may be summarized as including a communication module that is an intermediate node between an access point and a plurality of client devices wirelessly communicating with the access point over a Wi-Fi protocol; the communication module including: a plurality of antennas; a transit power supply; a power input terminal configured to be coupled to a power supply terminal of a docking station; a power module coupled to the transit power supply and the power input terminal; and a processor configured to: switch operation of the device to a low-power mode when the power module is receiving power from the transit power supply; and switch operation of the device to a normal mode when the power module is receiving power from the power input terminal.

The transit power supply may include a battery. The transit power supply may include a supercapacitor. The power input terminal may include a wireless power receiver. The device may further include: a sensor that measures a state of charge of the transit power supply; and an indicator configured to notify a user if the state of charge is less than a threshold.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A network management system comprising:
an access point at a fixed location and communicatively coupled to a network to receive and transmit data with the network, wherein the access point is further configured to receive and transmit data according to a wireless connection with one or more client devices;
a plurality of docking stations, each docking station fixed in a respective separate location and having a communication interface and a power supply terminal; and
a portable mesh node having:
a wireless transceiver configured to wirelessly communicate with the access point; and
a client transceiver configured to communicate with a client device, the portable mesh node providing an intermediate node in a mesh network for communication between the access point and the client device via the portable mesh node,
wherein the portable mesh node is movable to each of the respective separate locations at which one of the plurality of docking stations is located;
a power module within the portable mesh node;
a power input terminal coupled to the power module and configured to be connected to the power supply terminal of a respective docking station of the plurality of docking stations; and
a transit power supply within the portable mesh node, the transit power supply being coupled to the power module and configured to provide power to the power module when the portable mesh node is not connected to the power supply terminal of one of the plurality of docking stations,
wherein the portable mesh node is configured to maintain a communication connection with the access point when connected to one of the plurality of docking stations and when being moved between docking stations.

2. The network management system of claim 1, wherein a throughput of the wireless connection in the respective separate location is less than a coverage threshold, and the portable mesh node increases the throughput to a value greater than the coverage threshold in each location that the portable mesh node is placed.

3. The network management system of claim 2, wherein the portable mesh node includes a processor that is configured to:

determine if the portable mesh node is disconnected from the power supply terminal; and
in response, change an operation of the portable mesh node from a normal mode to a low-power mode.

4. The network management system of claim 3, wherein the portable mesh node includes a communication module that receives and transmits data at a first rate when the portable mesh node is operating in the normal mode, and receives and transmits data at a second rate when the portable mesh node is operating in the low-power mode, wherein the first rate is greater than the second rate.

5. The network management system of claim 4, wherein the communication module includes a plurality of antennas, a first subset of the plurality of antennas actively communicating with the access point and the client device in the normal mode operation, a second subset of the plurality of antennas actively communicating with the access point and the client device in the low-power mode operation, wherein the first subset is greater than the second subset.

6. The network management system of claim 3, wherein the processor is configured to:
determine if a number of client devices that are in communication with the portable mesh node in the normal mode operation is greater than a first threshold, and in response to the number of client devices being greater than the first threshold disqualifying any further connections until the number of client devices that are in communication with the portable mesh node become less than the first threshold; and
determine if the number of client devices that are in communication with the portable mesh node in the low-power mode operation is greater than a second threshold, and in response to the number of client devices being greater than the second threshold disqualifying any further connections until the number of client devices that are in communication with the portable mesh node become less than the second threshold, wherein the first threshold is greater than the second threshold.

7. The network management system of claim 3, wherein the portable mesh node includes a sensor that measures strength of a receiving signal from the access point and in response generates a throughput indicative signal.

8. The network management system of claim 7, wherein the processor compares the throughput indicative signal with a signal strength threshold, and generates an alarm signal when the throughput indicative signal is less than the signal strength threshold.

9. The network management system of claim 1, wherein the portable mesh node is configured to connect to the power supply terminal of one of the plurality of docking stations by a wireless power transfer module.

10. The network management system of claim 1, wherein at least one of the docking stations includes:
a communication interface that communicates with the access point and client devices in the respective location;
a sensor that indicates a throughput of the wireless connection to the client devices in the respective location; and
a processor that determines if the throughput of the wireless connection to the client devices in the respective location is less than a coverage threshold, and in response to the communication throughput being less than the coverage threshold, the processor generates a request signal for sending to the portable mesh node.

11. A method comprising:

mounting a plurality of docking stations in a respective plurality of locations having a throughput of a wireless connection between an access point at a fixed location and client devices in the respective plurality of locations, wherein the throughput is less than a threshold;

determining, by each of the plurality of docking stations, a demand of the wireless connection at each of the plurality of locations;

moving a portable mesh node to one of the locations having a respective docking station and a higher demand of the wireless connection compared with the other locations, the portable mesh node having a wireless transceiver configured to wirelessly communicate with the access point, and a client transceiver configured to communicate with a client device, the portable mesh node providing an intermediate node in a mesh network for communication between the access point and the client device via the portable mesh node;

supplying power to the portable mesh node from a transit power supply while the portable mesh node is in transit from a first docking station to a second docking station, the transit power supply maintaining the portable mesh node in operation during the moving; and coupling a power supply of the respective docking station in that location to a power input terminal of the portable mesh node.

12. The method of claim 11, further comprising:

determining if the portable mesh node is disconnected from the power supply of a respective docking station; and switching an operation of the portable mesh node from a normal mode to a low-power mode in response to determining that the portable mesh node is disconnected from the power supply.

13. The method of claim 12, wherein switching the operation of the portable mesh node from a normal mode to a low-power mode includes at least one of:

reducing a rate of exchanging data between the portable mesh node and the access point;

reducing a number of active antennas of the portable mesh node; and reducing a number of client devices connected to the portable mesh node.

14. The method of claim 11, further comprising:

transmitting a request signal to the portable mesh node by the docking station in response to determining the demand of the wireless connection in the respective location is higher than the demand of the wireless connection in the other locations.

15. The method of claim 11, further comprising:

measuring, by the portable mesh node, strength of a signal received from the access point; and generating an alert signal if the measured strength of the signal is less than a signal strength threshold.

16. A portable device comprising:

a communication module that is an intermediate node in a mesh network between an access point at a fixed location and a plurality of client devices wirelessly communicating with the access point over a wireless protocol, the communication module including:

a transit power supply;

a power input terminal configured to be coupled to a power supply terminal of a docking station; and a power module coupled to the transit power supply and the power input terminal, wherein the portable device is movable to a plurality of locations at which respective docking stations of a plurality of docking stations are located; and a processor configured to:

switch operation of the portable device to a low-power mode when the power module is receiving power from the transit power supply; and switch operation of the portable device to a normal mode when the power module is receiving power from the power input terminal, wherein the portable device is configured to maintain a communication connection with the access point when connected to one of the plurality of docking stations and when being moved between docking stations.

17. The portable device of claim 16, wherein the transit power supply includes a battery.

18. The portable device of claim 16, wherein the transit power supply includes a supercapacitor.

19. The portable device of claim 16, wherein the power input terminal includes a wireless power receiver.

20. The portable device of claim 16, wherein the portable device further includes:

a sensor that measures a state of charge of the transit power supply; and an indicator configured to notify a user if the state of charge is less than a threshold.

* * * * *